United States Patent [19]

Yamazaki et al.

[11] Patent Number: 5,137,749
[45] Date of Patent: Aug. 11, 1992

[54] METHOD OF FORMING METAL OXIDE FILM BY USING METAL ALKOXIDE SOLUTION

[75] Inventors: Seizi Yamazaki, Matsusaka; Kensuke Makita, Mie; Yasuo Moriguchi; Katsuto Tanaka, both of Matsusaka, all of Japan

[73] Assignee: Central Glass Company, Limited, Ube, Japan

[21] Appl. No.: 630,005

[22] Filed: Dec. 19, 1990

[30] Foreign Application Priority Data

Dec. 20, 1989 [JP] Japan ................................. 1-330075

[51] Int. Cl.$^5$ ............................................. B05D 5/06
[52] U.S. Cl. ................... 427/108; 427/126.2; 427/126.3; 427/165; 427/226
[58] Field of Search ...................... 427/226, 108, 126.2, 427/126.3, 165

[56] References Cited

U.S. PATENT DOCUMENTS

| | | | |
|---|---|---|---|
| 4,397,666 | 8/1983 | Mishima et al. | 65/18.3 |
| 4,708,821 | 11/1987 | Shimokawa | 252/49.5 |
| 4,874,462 | 10/1989 | Makita et al. | 156/635 |
| 4,943,542 | 7/1990 | Hayashi | 501/12 |

FOREIGN PATENT DOCUMENTS 2208874 4/1989 United Kingdom .

*Primary Examiner*—Janyce Bell
*Attorney, Agent, or Firm*—Fleit, Jacobson, Cohn, Price, Holman & Stern

[57] ABSTRACT

The invention relates to a sol-gel method for forming a metal oxide film, e.g. $TiO_2$ film or $TiO_2$-$SiO_2$ film, on a substrate by applying a solution of at least one metal alkoxide to the substrate to form a sol film on the substrate, drying the sol film to cause it to turn into a gel film by hydrolysis and baking the gel film. According to the invention the viscosity of the metal alkoxide solution is adequately increased, preferably to 3-30 cP at 20° C., by the addition of a combination of a hydroxypropyl cellulose of which 2 wt % aqueous solution has a viscosity of 150-400 cP at 20° C. and another hydroxypropyl cellulose of which 2 wt % aqueous solution has a viscosity of 6-10 cP at 20° C. Metal oxide films formed by this method are free from minute cracks and excellent in optical characteristics and durability. By this method it is possible to form a metal oxide film as thick as about 300 nm without repeating the application of the alkoxide solution to the substrate.

9 Claims, No Drawings

METHOD OF FORMING METAL OXIDE FILM BY USING METAL ALKOXIDE SOLUTION

BACKGROUND OF THE INVENTION

This invention relates to a method of forming a metal alkoxide film on a substrate by a so-called sol-gel method using a metal alkoxide solution, and more particularly to the addition of a viscosity adjusting agent to the metal alkoxide solution.

It is well known to form a metal oxide film represented by titanium oxide film on a substrate such as a glass plate by a sol-gel method, i.e. by applying a metal alkoxide solution to the substrate, converting the alkoxide sol film on the substrate into a gel film by hydrolysis and then baking the gel film. Recently practical applications of this method have been increasing for forming metal oxide coating films for electronical, optical or ornamental purposes.

In forming a metal oxide film by the sol-gel method it is important to use a metal alkoxide solution having an adequate viscosity for both the productivity of the film forming process and the quality of the obtained film. In this regard U.S. Pat. No. 4,397,666 proposes to add a water soluble cellulose ether such as hydroxypropyl cellulose as a viscosity adjusting (increasing) agent to a silicon alkoxide solution. However, even though this proposal is employed it is not rarely that the obtained oxide film has minute cracks which are probably attributed to shrinkage of the gel film during baking.

By the sol-gel method it is not easy to form a relatively thick film of a metal oxide, viz. a film having a thickness of about 200-300 nm. The thickness of the obtained oxide film depends on the thickness of the initially formed sol film, and if an alkoxide solution having a very high viscosity is used in order to form a thick sol film it is difficult to obtain an oxide film of good quality. In this regard GB-A 2,208,874, which relates to the use of a chlorine containing titanium alkoxide to form a titanium oxide film by the sol-gel method, shows to repeat the steps of applying an alkoxide solution to a substrate, drying the alkoxide sol film on the substrate until a gel film having a desired thickness is formed. By this method it is possible to form a metal oxide film having a thickness of about 200-300 nm and fairly good quality, but the repetition of the coating and drying operations is unfavorable for the productivity of the film-forming process.

SUMMARY OF THE INVENTION

It is an object of the present invention to provide an improved method for forming a metal oxide film on a substrate by using a metal alkoxide solution, by which method an aimed oxide film of high quality can easily be formed.

It is another object of the invention to provide an improved method for forming a metal oxide film on a substrate by using a metal alkoxide solution, by which method a relatively thick film of the aimed oxide, viz. a film having a thickness of 200-300 nm, can be formed without the need of repeating the application of the alkoxide solution to the substrate.

The present invention provides a method of forming a metal oxide film on a substrate, the method having the steps of preparing a solution of at least one metal alkoxide, suitably adjusting the viscosity of the alkoxide solution by adding thereto a viscosity adjusting agent, thereafter applying the alkoxide solution to a substrate to form a sol film on the substrate, drying the sol film to cause the sol film to turn into a gel film and baking the gel film. The method of the invention is characterized in that the viscosity adjusting agent is a combination of a first hydroxypropyl cellulose of which 2 wt % aqueous solution has a viscosity in the range from 150 to 400 cP (centipoises) at 20° C. and a second hydroxypropyl cellulose of which 2 wt % aqueous solution has a viscosity in the range from 6 to 10 cP at 20° C.

It is preferable to use a mixture of a relatively large amount of the first hydroxypropyl cellulose and a relatively small amount of the second hydroxypropyl cellulose, and it is also preferable to add a solution of the first hydroxypropyl cellulose and the second hydroxypropyl cellulose in an alcohol to the metal alkoxide solution.

By jointly using the above defined first hydroxypropyl cellulose and the above defined second hydroxypropyl cellulose to adequately increase the viscosity of the metal alkoxide solution, the formation of a sol film by application of the alkoxide solution to a substrate, strate, the conversion of the sol film into a gel film and the baking of the gel film can easily and appropriately be accomplised. Moreover, by this method it is easy to form a metal oxide film which is uniform in thickness, free from minute cracks and excellent in optical characteristics and also in durability, and such a good resut is obtained with good reproducibility.

By using the method according to the invention it is possible to form a relatively thick film, such as an about 300 nm thick film, of a metal oxide without the need of repeatedly applying the alkoxide solution to the substrate, and the obtained thick film is defectless.

This invention is applicable to the formation of coating films of various metal oxides such as, for example, $TiO_2$, $SiO_2$, $ZrO_2$ adn $Al_2O_3$ and mixed metal oxides represented by $TiO_2$-$SiO_2$ on glass, ceramic or metal substrates. According to the need, a gel film formed by using the invention may be patterned by a selective etching method such as, for example, the method disclosed in U.S. Pat. No. 4,874,462.

This invention is useful for the formation of metal oxide films for various purposes in optics, electronics, ornaments, etc., including selectively reflective films, nonreflective coating films and coating films of head-up displays.

DESCRIPTION OF THE PREFERRED EMBODIMENTS

Alkoxides of various metals such as Ti, Si, Zr and Al are useful in the present invention. Usually a selection is made from methoxides, ethoxides, propoxides, isopropoxides and butoxides. Typical examples are titanium tetraisopropoxide, silicon tetramethoxide, silicon tetraethoxide and zirconium tetrapropoxide. Also it is possible to use a Cl-containing alkoxide represented by $MCl_y(OR)_x$ (M is a metal of which the valence is $x+y$, R is a $C_1$ to $C_{10}$ alkyl or alkoxyalkyl group) such as $TiCl_{4-x}(OR)_x$ (usually x is from 2 to 3.5). When it is intended to form a film of a mixed metal oxide, alkoxides of two or more kinds of metals are used jointly.

As a solvent for preparing a metal alkoxide solution it is suitable to use a lower alcohol such as methanol, ethanol, propanol, isopropanol or butanol. Optionally the alcohol may be mixed with a relatively small amount of a different kind of organic solvent selected from, for example, hydrocarbons, ketones and acetic esters. Also it is optional to add a small amount of water to the solvent. Usually it is suitable that the concentration of the metal alkoxide(s) in the solution falls in the range from 0.01 to 2.0 mol/liter. For example, in the case of dip coating the concentration range of from 0.1 to 2.0 mol/l is suitable, whereas in the case of using a curtain coater the concentration range of from 0.01 to 0.5 mol/l is suitable.

According to the invention the viscosity of the metal alkoxide solution is adequately increased by the addition of a hydroxypropyl cellulose of which 2 wt % aqueous solution has a viscosity of 150–400 cP at 20° C. and another hyroxypropyl cellulose of which 2 wt % aqueous solution has a viscosity of 6–10 cP at 20° C. Hereinafter the former hydroxypropyl cellulose will be referred to as HPC-M and the latter hydroxypropyl cellulose as HPC-L. It is possible to directly add HPC-M and HPC-L to the metal alkoxide solution, but it is preferable to dissolve HPC-M and HPC-L in a lower alcohol in advance and then add the solution of HPC-M and HPC-L to the alkoxide solution. After the addition the mixed solutions is stirred to obtain a uniform solution.

It is possible to increase the viscosity of a metal alkoxide solution by using a different kind of viscosity adjusting agent such as methyl cellulose, ethyl cellulose or polyethylene glycol. However, when methyl cellulose or ethyl cellulose is used it takes a considerably longer time to fully dissolve the cellulose ether in the solvent than in the case of using hydroxypropl cellulose, and a film formed by the application of the resultant alkoxide solution is liable to crack during drying. When polyethylene glycol is used it is easy to accomplish dissolution and mixing, but the drying of a sol film formed by the application of the resultant alkoxide solution takes a long time and has to be accomplished by a heat treatment at a temperature close to 300° C. When the drying is carried out at such a high temperature it becomes impracticable to selectively etch the resultant gel film to obtain a patterned film by the patterning method disclosed in U.S. Pat. No. 4,874,462 since the patterning method requires that the chemical treatment of the gel film for decomposition in selected areas be performed at a temperature below 300° C. Furthermore, the gel film obtained by drying at high temperature is liable to crack during the subsequent baking operation.

When a metal oxide film is formed on a substrate by a conventional sol-gel method it is not rarely that minute cracks appear in the oxide film. An important merit of the present invention, i.e. adjusting the viscosity of the alkoxide solution with a mixture of HPC-M and HPC-L, is that the probability of such cracking of the film greatly lessens. Presumably the coexistance of HPC-M and HPC-L different in viscosities of solutions has the effect of relieving the gel film under baking from stresses induced by thermal shrinkage and consequently suppressing cracking of the film. In contrast, when the viscosity of the alkoxide solution is increased by using HPC-M alone it is often that minute cracks ranging from $10^{-2}$ to $10^{-1}$ mm in size appear in the obtained oxide film particularly in a region adjacent to the substrate surface, and this tendency is particularly significant when the aforementioned patterning method is employed. When HPC-L alone is used it is necessary to add an undesirably large amount of HPC-L to the alkoxide solution for increasing the viscosity of the solution to a desired level, and it is difficult to obtain a metal oxide film of very good quality.

In using a mixture of HPC-M and HPC-L it is suitable that HPC-M occupies a major part of the mixture. More particularly, with a view to suppressing or minimizing minute cracking of the obtained film, it is suitable that the proportion of HPC-M to HPC-L falls in the range from 70:30 to 97:3 by weight, and preferably from 80:20 to 95:5 by weight.

The total amount of HPC-M and HPC-L in the metal alkoxide solution is not strictly limited. Usually by controlling the total amount of HPC-M and HPC-L within the range from 0.1 to 5 wt % of the metal alkoxide solution it is possible to form a sufficently thick film of a metal oxide, viz. a film having a thickness of 200–300 nm, by a single process of applying the alkoxide solution to a substrate, drying the sol film on the substrate until it turns into a gel film and baking the gel film without repeating the application of the solution. Preferably the total amount of HPC-M and HPC-L is not more than 3 wt % of the alkoxide solution. From another aspect, it is suitable to adjust the total amount of HPC-M and HPC-L such that the obtained alkoxide solution has a viscosity in the range from 3 to 30 cP, and preferably from 5 to 15 cP, at about 20° C.

After suitably increasing the viscosity by the addition of HPC-M and HPC-L the metal alkoxide solution is applied to a substrate by a known coating method such as dip coating, spin coating, spray coating or roll coating. The material of the substrate is not limited. For example, a metal substrate, a glass substrate or a ceramic substrate can be used. In most cases either a dip coating method or a spin coating method is preferred because of ease of operation and excellence of the finally obtained metal oxide film particularly in optical characteristics. Usually the liquid film on the substrate is left to natural drying for several minutes to tens of minutes to allow most of the solvent to evaporate and to allow the alkoxide(s) to be hydrolyzed by water contained in the solution or moisture in the atmosphere. After that the film is dried by heating at about 100°–200° C. to convert the sol film into a gel film, and the dried gel film is baked in air or an alternative oxygen-containing gas atmosphere at a temperature above 400° C. to thereby obtain a metal oxide film as a coating on the substrate. In the case of forming a patterned film of metal oxide the gel film is selectively etched by a suitable techinique before the baking operation.

The following nonlimitative examples are illustrative of the invention.

EXAMPLE 1

Titanium tetraisopropoxide and silicon tetraethoxide (ethyl silicate) were dissolved in a mixture of isopropyl alcohol and a small amount of ethyl cellosolve. The proportion of the titanium alkoxide to the silicon alkoxide was about 80:20 by mol, and the total concentration of the alkoxides in the obtained solution was about 0.5 mol/liter. Then small amounts of water and hydrochloric acid were added to the solution, and the solution was well stirred. Separately, HPC-M (90 parts by weight) and HPC-L (10 parts by weight) were dissolved in ethyl alcohol, and the obtained solution was added to the alkoxide solution. The total amount of HPC-M and HPC-L was about 0.35 wt % of the alkoxide solution. At 20° C., 2 wt % aqueous solution of HPC-M used in this example had a viscosity of about 250 cP, and 2 wt % aqueous solution of HPC-L used in this example had a viscosity of about 8 cP. The mixed solution was stirred for about 3 hr to thereby obtain a viscous alkoxide solution, which had a viscosity of about 6.8 cP at 20° C.

A cleaned glass substrate was dipped into the viscous alkoxide solution and then gently pulled up from the solution at a constant rate of about 4.5 mm/sec. The viscous liquid film on each side of the glass substrate was solidified by drying with hot air having a temperature of about 100° C. Next, the solidified film on the glass substrate was baked in air at about 600° C. for about 5 min to thereby obtain a $TiO_2$-$SiO_2$ mixed oxide film having a thickness of about 200 nm.

The obtained oxide film was transparent and optically uniform. By observation with a microscope of 400 magnifications the oxide film was free from minute cracks. This film proved to be very hard and firm in the adhesion to the glass substrate. That is, the film was subjected to an abrasion resistance test (Taber's test) according to JIS R 3212, using two abrading wheels each of which was turned under a load of 500 g. After 1000 turns of each abrading wheel the amount of a change in Haze value (ΔHaze) of the oxide film was only 1–2%.

EXAMPLE 2

A mixture of Cl-containing titanium alkoxide, $TiCl_{0.5}(OC_3H_7)_{3.5}$, and colloidal silica was prepared. The proportion of the alkoxide to colloidal silica was about 85:15 by mol, calculated as oxides. A mixture of isopropyl alcohol and a small amount of ethyl acetate was added to the mixture of the alkoxide and colloidal silica so as to obtain an alkoxide solution in which the total concentration of solutes was about 0.55 mol/liter. Separately, the HPC-M used in Example 1 (85 parts by weight) and the HPC-L used in Example 1 (15 parts by weight) were dissolved in 2-ethoxyethanol, and the obtained solution was added to the alkoxide solution. The total amount of HPC-M and HPC-L was about 0.4 wt % of the alkoxide solution. The mixed solution was stirred for about 3 hr to thereby obtain a viscous alkoxide solution, which had a viscosity of about 7.0 cP at 20° C. This viscosity value was about 3 times as high as the viscosity value before the addition of the hydroxypropyl cellulose solution.

A cleaned glass substrate was dipped into the viscous alkoxide solution and then gently pulled up from the solution at a constant rate of about 4.6 mm/sec. The viscous liquid film on each side of the glass substrate was solidified by drying at about 100° C. for about 30 sec. The solidified film on one side of the glass substrate was patterned by the method according to U.S. Pat. No. 4,874,462. That is, the gel film was selectively etched by the steps of applying a viscous liquid containing a decomposing agent to the gel film in unnecessary areas by screen printing, heating the treated gel film at about 200° C. to harden the film in necessary areas and then washing the film with an acid solution to remove the unhardened portions of the film in the unnecessary areas. Next, the patterned film was baked in air at about 600° C. for about 5 min to thereby obtain a $TiO^2$-$SiO^2$ mixed oxide film having a thickness of about 240 nm.

The obtained oxide film was transparent and optically uniform. This oxide film had a refractive index of about 2.10 and exhibited good reflective characteristics. By observation with a microscope of 400 magnifications the oxide film was free from minute cracks. By the abrasion resistance test described in Example 1 this film proved to be very hard and firm in the adhesion to the glass substrate.

COMPARATIVE EXAMPLE 1

A mixed alkoxide solution of titanium tetraisopropoxide and silicon tetraethoxide was prepared in the same manner as in Example 1. Then a solution of the HPC-M used in Example 1 in ethyl alcohol was added to the alkoxide solution such that HPC-M amounted to about 0.4 wt % of the alkoxide solution. The mixed solution was stirred for 3 hr to thereby obtain a viscous alkoxide solution, which had a viscosity of about 8.7 cP at 20° C.

Using this alkoxide solution, the coating, drying and baking process of Example 1 was repeated. As the result a $TiO^2$-$SiO^2$ mixed oxide film was formed on the glass substrate. The oxide film has a thickness of about 230 nm.

The oxide film seemed to be uniform by observation with the naked eye, but observation with a microscope of 200 magnifications revealed the existence of many minute cracks ranging from about 0.01 mm to about 0.5 mm in size in a peripheral region of the film. The oxide film was subjected to the aforementioned abrasion resistance test. In this case 100 turns of each abrading wheel resulted in 6–8% change in the Haze value of the oxide film.

COMPARATIVE EXAMPLE 2

A mixed solution of titanium tetraisopropoxide and silicon tetraethoxide was prepared in the same manner as in Example 1. Separately, 90 parts by weight of the HPC-M used in Example 1 and 10 parts by weight of another hydroxypropyl cellulose (referred to as HPC-H) of which 2 wt % aqueous solution had a viscosity of 1000–4000 cP at 20° C. were dissolved in 2-ethoxyethanol, and the obtained solution was added to the alkoxide solution such that the total amount of HPC-M and HPC-H became about 0.1 wt % of the alkoxide solution. The mixed solution was stirred for 3 hr to thereby obtain a viscous alkoxide solution, which had a viscosity of about 30 cP at 20° C.

Using this alkoxide solution, the coating, drying and baking process of Example 1 was repeated except that the rate of pulling up the glass substrate from the solution was changed to about 2.5 mm/sec. As the result a $TiO^2$-$SiO^2$ mixed oxide film was formed on the glass substrate. In this case the oxide film had a thickness of about 320 nm.

By observation with a microscope of 20 magnifications it was easy to find the existence of minute cracks ranging from about 0.1 1mm to about 0.5 mm in size in every region of the oxide film. By the aforementioned abrading test the amount of a change in Haze value of the oxide film soon became more than 10%.

COMPARATIVE EXAMPLE 3

The alkoxide solution of Example 2 was modified by using polyethylene glycol as a viscosity adjusting (increasing) agent in place of the mixture of HPC-M and HPC-L. The amount of polyethylene glycol was 5 vol % of the alkoxide solution, and the resultant solution had a viscosity of about 8.2 cP at 20° C.

Using this alkoxide solution, the coating, drying, patterning and baking process of Example 2 was repeated under the same conditions. After the selective etching operation the gel film was still relatively soft, and on the surface of the patterned gel film there was a trace of the screen used in the application of the decomposing agent by screen printing. The oxide film obtained by baking the patterned gel film had many minute cracks which could be detected by observation with the naked eye.

What is claimed is:

1. A method of forming a metal oxide film on a substrate, the method having the steps of preparing a solution of at least one metal alkoxide, adjusting the viscosity of the alkoxide solution by adding thereto a viscosity adjusting agent, thereafter applying the alkoxide solution to the substrate to form a sol film on the substrate, drying the sol film to cause the sol film to turn into a gel film and baking the gel film to a temperature sufficient to convert the gel film to the metal oxide film, characterized in that said viscosity adjusting agent is a combination of a first hydroxypropyl cellulose of which 2 wt % aqueous solution has a viscosity in the range from 150 to 400 centipoises at 20° C. and a second hydroxypropyl cellulose of which 2 wt % aqueous solution has a viscosity in the range from 6 to 10 centipoises at 20° C., wherein the proportion of said first hydroxypropyl cellulose to said second hydroxypropyl cellulose is in the range from 70:30 to 97:3 by weight.

2. A method according to claim 1, wherein said substrate is a glass substrate.

3. A method according to claim 1, wherein said proportion is in the range from 80:20 to 95:5.

4. A method according to claim 1, wherein said combination of said first hydroxypropyl cellulose and said second hydroxypropyl cellulose is dissolved in an alcohol before adding the combination to the metal alkoxide solution.

5. A method according to claim 1, wherein the total amount of said first hydroxypropyl cellulose and said second hydroxypropyl cellulose is from 0.1 to 5 wt % of the metal alkoxide solution.

6. A method according to claim 1, wherein the total amount of said first hydroxypropyl cellulose and said second hydroxypropyl cellulose is such that after the addition of said combination the metal alkoxide solution has a viscosity in the range from 3 to 30 centipoises at 20° C.

7. A method according to claim 6, wherein said viscosity of the metal alkoxide solution is in the range from 5 to 15 centipoises at 20° C.

8. A method according to claim 1, wherein the metal alkoxide solution comprises a titanium alkoxide.

9. A method according to claim 8, wherein the metal alkoxide solution further comprises a silicon alkoxide.

* * * * *